(12) United States Patent
Kobayashi et al.

(10) Patent No.: US 6,887,155 B2
(45) Date of Patent: May 3, 2005

(54) VIDEO GAME SYSTEM, VIDEO GAME APPARATUS, CONTROLLING METHOD THEREFOR AND A RECORDING MEDIUM FOR VIDEO GAME PROGRAM

(75) Inventors: Yoichi Kobayashi, Tokyo (JP); Kohei Nojiri, Saitama (JP); Hiroshi Udagawa, Tokyo (JP); Masato Nakamura, Kanagawa (JP); Koichiro Ishigami, Kanagawa (JP); Haruo Asano, Tokyo (JP)

(73) Assignee: Sony Corporation, Tokyo (JP)

( * ) Notice: Subject to any disclaimer, the term of this patent is extended or adjusted under 35 U.S.C. 154(b) by 23 days.

(21) Appl. No.: 09/892,915

(22) Filed: Jun. 26, 2001

(65) Prior Publication Data

US 2002/0082089 A1 Jun. 27, 2002

(30) Foreign Application Priority Data

Jun. 28, 2000 (JP) ........................................ 2000-195067
Sep. 8, 2000 (JP) ........................................ 2000-274194

(51) Int. Cl.$^7$ ................................................ A63F 9/24
(52) U.S. Cl. ...................................................... 463/30
(58) Field of Search ......................... 463/46–47, 43, 463/30–31; 273/148 B; 347/19; 358/1.1–1.16, 1.17–1.19; 400/61, 70, 76

(56) References Cited

U.S. PATENT DOCUMENTS 5,224,416 A     7/1993  Malin et al.
5,678,002 A  * 10/1997  Fawcett et al. ............. 345/709
5,718,631 A     2/1998  Invencion
5,759,102 A  *  6/1998  Pease et al. .................. 463/42
5,974,474 A    10/1999  Furner et al.
5,993,088 A  * 11/1999  Nogay et al. ................. 400/78
6,160,551 A    12/2000  Naughton
6,336,865 B1    1/2002  Kinjo

FOREIGN PATENT DOCUMENTS

| EP | 1 175 927 A2 | 1/2002 |
|---|---|---|
| JP | 09000739 | 1/1997 |
| JP | 10181119 | 7/1998 |
| JP | 11184656 | 7/1999 |
| JP | 11203066 | 7/1999 |

OTHER PUBLICATIONS

JPO Publication No. 09–000739–English Translation supplied by the Japan Patent Office [http://www.ipdl.jpo.go.jp/homepg_e.ipdl].*

* cited by examiner

*Primary Examiner*—Mark Sager
(74) *Attorney, Agent, or Firm*—Frommer Lawrence & Haug LLP; William S. Frommer; Samuel S. Lee

(57) ABSTRACT

In progressing a video gate in accordance with a game software program read out from a video game program recording medium and in converting the contents for printing into printing data, which is printed, the printer driver stored in a non-volatile memory is to be updated to enable the printing by the latest printer driver. To this end, as a printer driver is read from the video game program recording medium at step S11, the version of the printer driver as read out is checked at step S12. If the printer driver as read out is of a new version, the printer driver in the memory card is updated at step S13.

11 Claims, 10 Drawing Sheets

VIDEO GAME SYSTEM, VIDEO GAME APPARATUS, CONTROLLING METHOD THEREFOR AND A RECORDING MEDIUM FOR VIDEO GAME PROGRAM

BACKGROUND OF THE INVENTION

1. Field of the Invention

This invention relates to a video game system for executing a video game in accordance with a video software program, a video game apparatus, a controlling method therefor and a recording medium for a video game program.

2. Description of Related Art

Among domestic video games, there are, for example, a game for carrying out a motor-cycle or car racing, and a roll playing game in which a character moved by a player operation combats against a fighting character. Such video game proceeds to the next game stage, as the player clears a game stage, and comes to a close when the layer clears the last stage.

In the conventional domestic game apparatus, only the picture or the sound, changing with the game progress, can be enjoyed. Moreover, if the last stage of the game is cleared, or many points are won, it is not possible to acquire a certificate which testifies to it.

SUMMARY OF THE INVENTION

It is therefore an object of the present invention to provide a video game system for executing a video game in accordance with a video software program, a video game apparatus, a controlling method therefor and a recording medium for the video game program, in which, when a video game is to be progressed in accordance with a game software program read out from the video game program, and contents to be printed are converted into printing data for printing, a printer driver stored in a non-volatile memory is updated to enable printing to be executed even on a printer apparatus of an unknown type.

In one aspect, the present invention provides a video game system in which a video game is progressed in accordance with a game software program read out form a video game program recording medium and, if there exist contents to be printed in the course of the progress of the video game, the contents are converted into printing data to be printed, said system comprising a video game apparatus which comprises video game software program readout means for reading out a video game software program from a video game program recording medium, having recorded thereon said video game software program, said video game software program being made up of a main portion of the video game software program, printing contents data and a printer driver for printing said printing contents data, a non-volatile memory for storing the printer driver along with the information on game progress, printer driver updating means for updating the printer driver stored in said non-volatile memory by the new printer driver contained in the game software program read out by said video game software program readout means, and printing controlling means for reading out the printer driver stored in said non-volatile memory to a work memory and for converting the printing contents data read out from said video game program recording medium by said video game software program readout means into printing data by using the printer driver on said work memory to output the printing data, and a printing apparatus for printing said printing data.

In still another aspect, the present invention provides a video game apparatus used in a video game system in which a video game is progressed in accordance with a game software program read out form a video game program recording medium and, if there exist contents to be printed in the course of the progress of the video game, the contents are converted into printing data to be printed, said video game apparatus comprising video game software program readout means for reading out a video game software program from a video game program recording medium, having recorded thereon said video game software program, said video game software program being made up of a main portion of the video game software program, printing contents data and a printer driver for printing said printing contents data, a non-volatile memory for storing the printer driver along with the information on the game progress, printer driver updating means for updating the printer driver stored in said non-volatile memory by the new printer driver contained in the game software program read out by said video game software program readout means, and printing controlling means for reading out the printer driver stored in said non-volatile memory to a work memory and for converting the printing contents data read out from said video game program recording medium by said video game software program readout means into printing data by using the printer driver on said work memory to output the printing data.

In still another aspect, the present invention provides a method for controlling a video game apparatus comprising the steps of reading out a video game software program from a video game program recording medium, having recorded thereon said video game software program, said video game software program being made up of a main portion of the video game software program, printing contents data and a printer driver for printing said printing contents data to execute a video game in accordance with said video game software program, updating the printer driver stored in a non-volatile memory along with information on the game progress by a new printer driver contained in the game software program read out from said video game program recording medium, and reading out the printer driver stored in said non-volatile memory to a work memory and converting the printing contents data read out from said video game program recording medium into printing data by using the printer driver on said work memory to print the printing data.

In yet another aspect, the present invention provides a video game program recording medium having recorded thereon a computer-readable video game software program, wherein said video software program comprises a main portion of a video game software program, printing contents data; and a printer driver for printing said printing contents data.

According to the present invention, as described above, a video game software program is read out from a video game program recording medium, having recorded thereon a video game software program comprised of a main portion of the video game software program, printing contents data, and a printer driver for printing the printing contents data. The video game is progressed in accordance with the video game software program so read out. The printer driver, stored in the non-volatile memory along with the information pertinent to the game progress, is updated by a new printer driver stored in the non-volatile memory contained in the video game software program read out from the video game program recording medium. The printing contents data, read out from the video game program recording medium, is converted by the printer driver on the work memory into printing data which are printed. Therefore, even if the printer driver stored in the video game program recording medium is of an old version, printing can be executed using the latest version of the printer driver.

DESCRIPTION OF THE PREFERRED EMBODIMENTS

Referring to the drawings, preferred embodiments of the present invention will be explained in detail.

Figure 1:
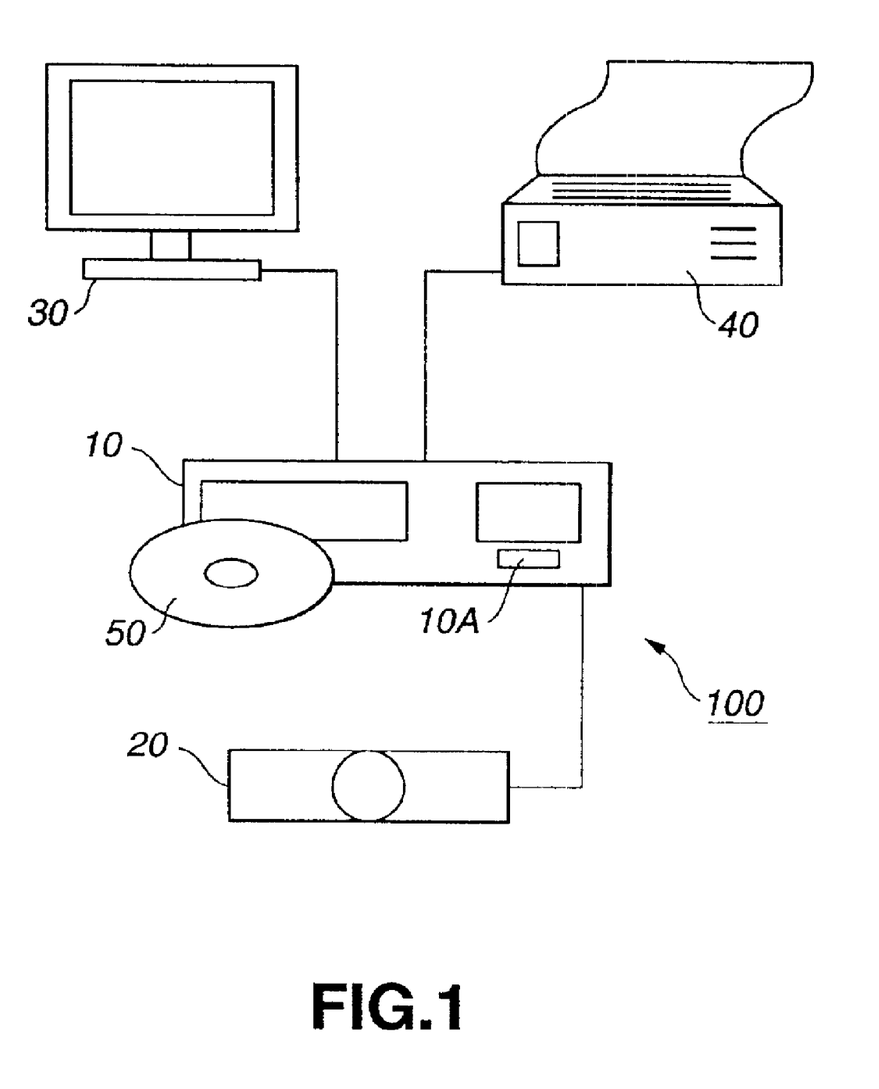
FIG. 1 is a schematic view showing a domestic game system according to the present invention.

The present invention is applied to a domestic game system 100 configured as shown for example in FIG. 1.

This domestic game system 100 is made up of a video game apparatus 10, a memory card 10A, comprised of a non-volatile memory, detachably mounted on this video game apparatus 10, a controller 20 connected to the video game apparatus 10, an image display device 30 and a printer 40.

Figure 2:
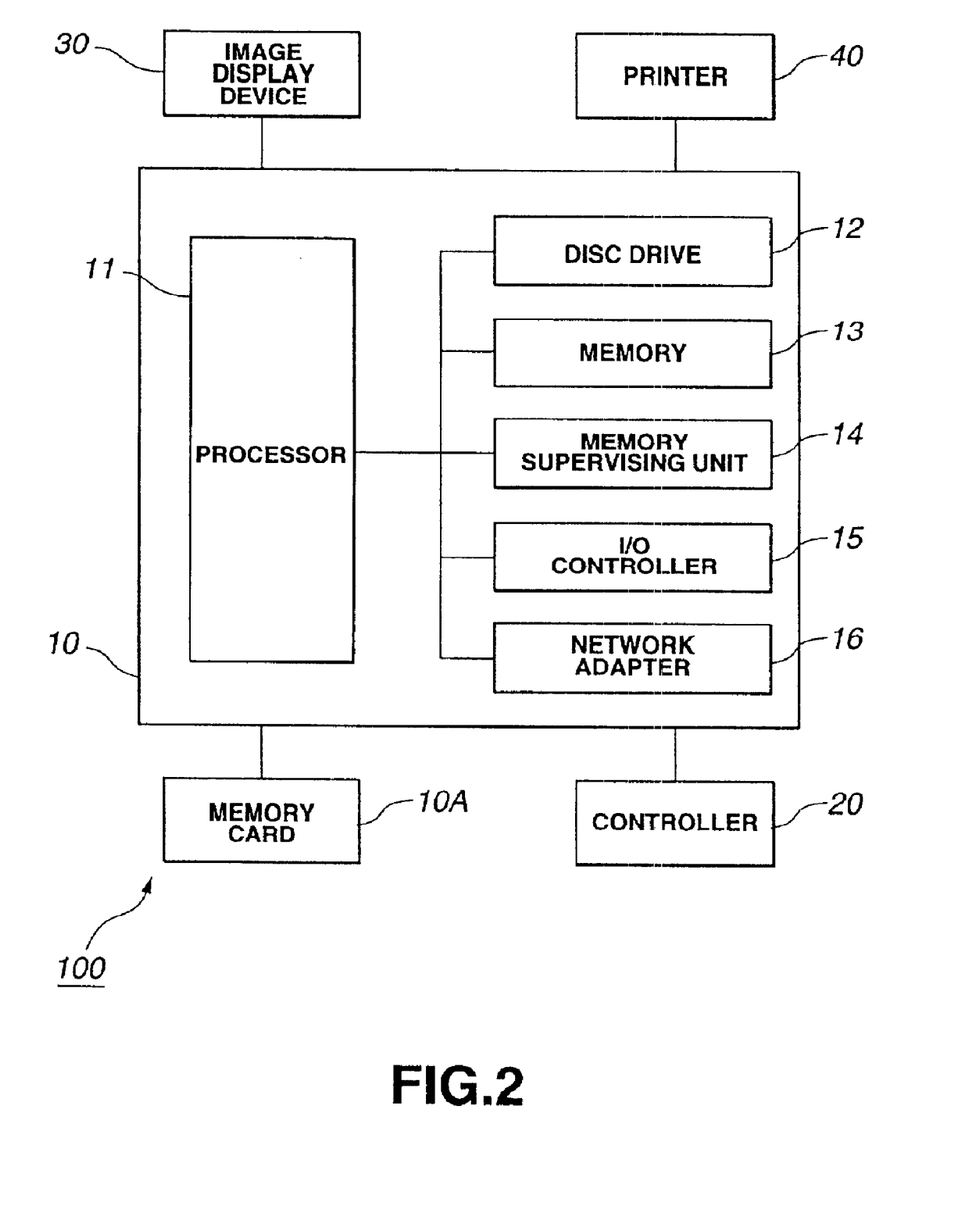
FIG. 2 is a block diagram showing a hardware configuration of a video game apparatus of the domestic game system shown in FIG. 1.

Referring to FIG. 2, showing the hardware structure of the video game apparatus 10, the video game apparatus 10 is configured for progressing a video game in accordance with a video software program read out from a video game program recording medium 50, such as CD-ROM or DVD, having the video software program recorded thereon. The video game apparatus 10 includes a processor 11, a disc drive 12, a memory 13, a memory supervising unit 14, an I/O controller 15 and a network adapter 16, as hardware, interconnected over an inner bus. The input/output equipment management function, image processing function, sound processing function, image display controlling function, printer controlling function and the network supervising function, for progressing the video game in accordance with the video software program and for enabling the printing of the privilege information corresponding to the game stage of the video game cleared, is implemented by software using the hardware described above.

In this video game apparatus 10, a USB (universal serial bus), as physical connection means to outside, is mounted on the I/O controller 15, so that, by a printer driver installed in the game application using a printer driver API, printing can be performed by a printer 40 connected over the USB.

Figure 3:
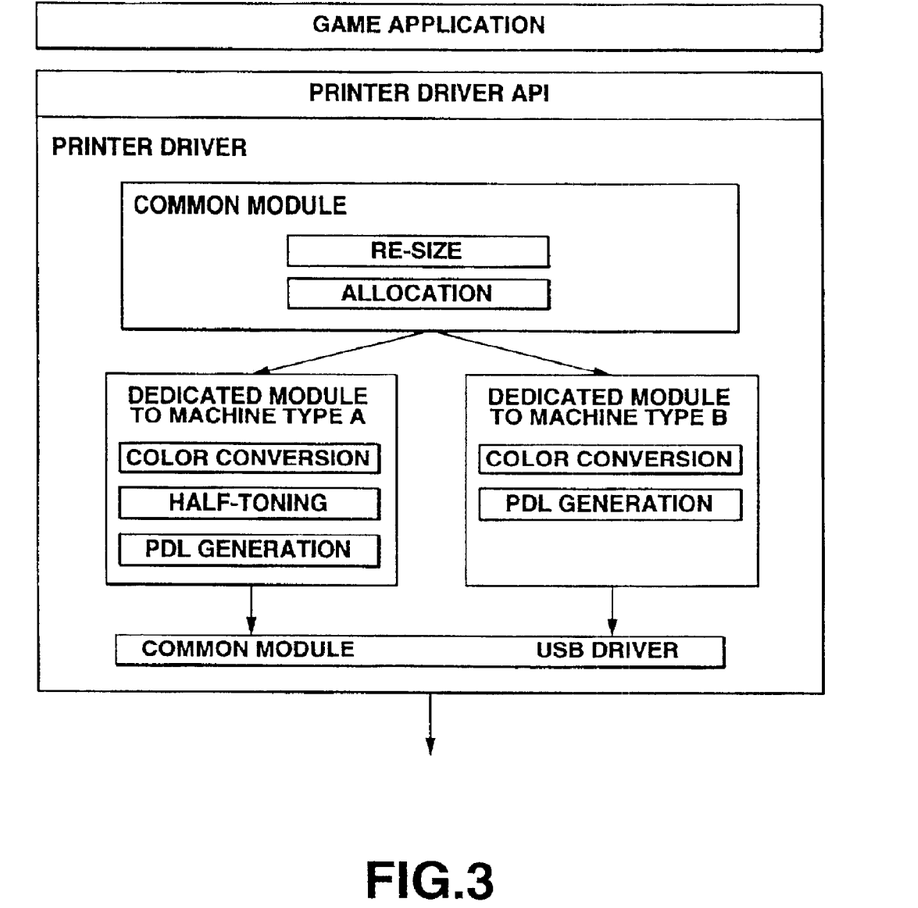
FIG. 3 schematically shows a software configuration for realizing a printer controlling function in the video game apparatus shown in FIG.2.

The printer controlling function in this video game apparatus 10 is implemented by the software configuration shown in FIG. 3.

In this video game apparatus 10, the printer driver, installed in the game application using the printer driver API, is made up of a common engine module, performing the processing not dependent on the printer type, and a dedicated engine module, proper to the machine type, performing the processing dependent on the printer type, and performs the following processing on printing contents delivered from the game application (RGB bitmap image).

The resolution conversion (resizing) is executed, using the common module, and the dedicated module proper to the machine type is called.

Next, the processing for color conversion of printing contents, such as the processing of converting the eight bits for each of RGB per pixel into eight bits for each of the CMY per pixel, or the half-toning of converting into each two bits of CMYK per pixel, is executed, using the module proper to the machine type. The printing control command translation processing proper to the machine type then is executed to generate printing data PDL.

The common engine module then is used to transmit the printing data PDL to the USB driver of the I/O controller 15.

The USB driver of the I/O controller 15 transmits the printer command over the USB cable to the USB port of the printer 40 connected over the USB.

Figure 4:
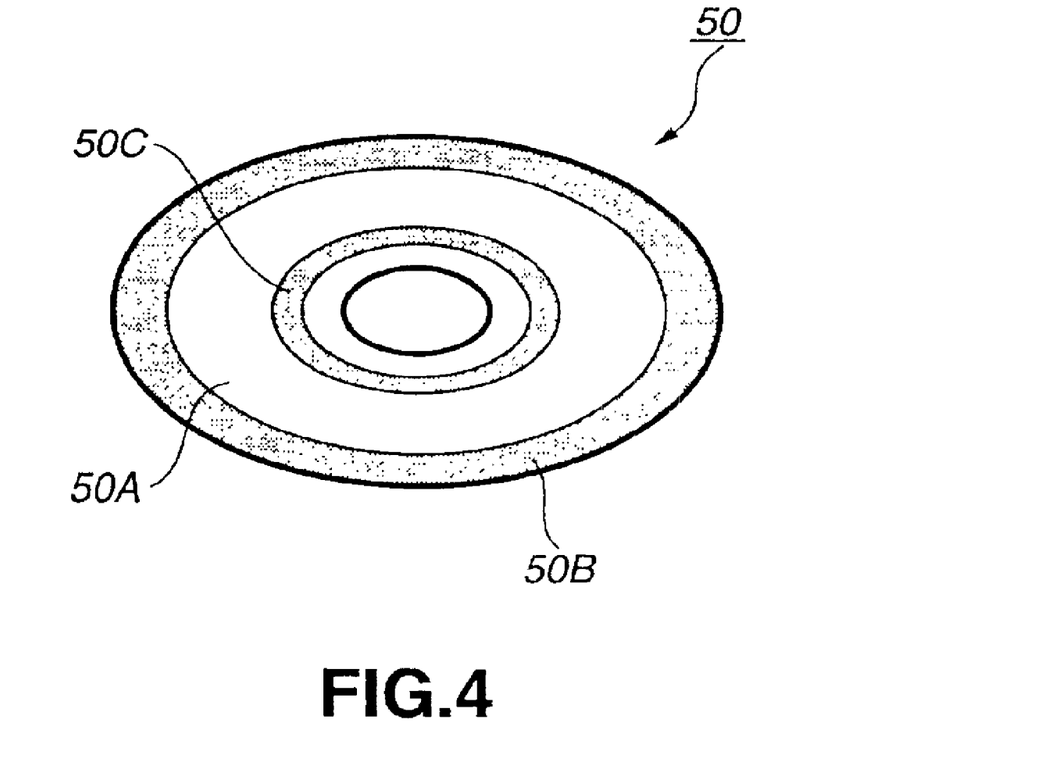
FIG. 4 schematically shows the structure of a video game program recording medium used in the domestic game system shown in FIG. 1.

It is noted that the video game program recording medium 50, used in the video game apparatus 10, has recorded therein a video software program made up of a main portion of the video software program 50A, the privilege information 50B corresponding to the game stage of the video game progressed in accordance with the video software program, and a printer driver 50C for enabling the printing of the privilege information corresponding to a game stage when the game stage is cleared, as shown in FIG. 4.

In this video game apparatus 10, the video software program is read out from the video game program recording medium 50, such as CD-ROM or DVD, by the disc drive 12, to a memory 13 used as a work memory, so as to be executed by the processor in accordance with the video software program. The image and the speech are generated in accordance with the video software program as the video software program proceeds. The I/O controller 15 detects the state of a player acting on operating means, such as a pad, a button or a lever, not shown, to transmit the detected state to the processor 11.

Figure 5:
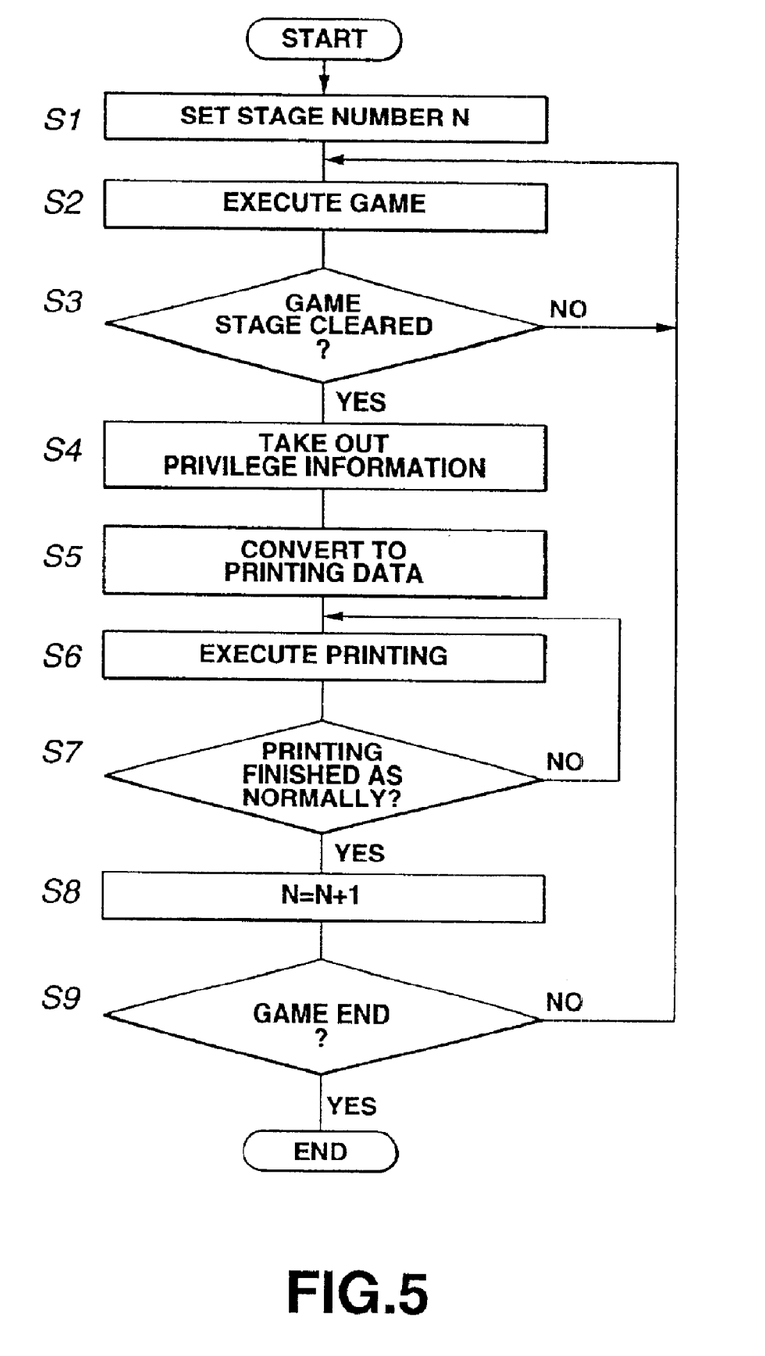
FIG. 5 is a flowchart for illustrating the sequence of execution of the video software program by a processor of the video game apparatus shown in FIG. 2.
Figure 6A:
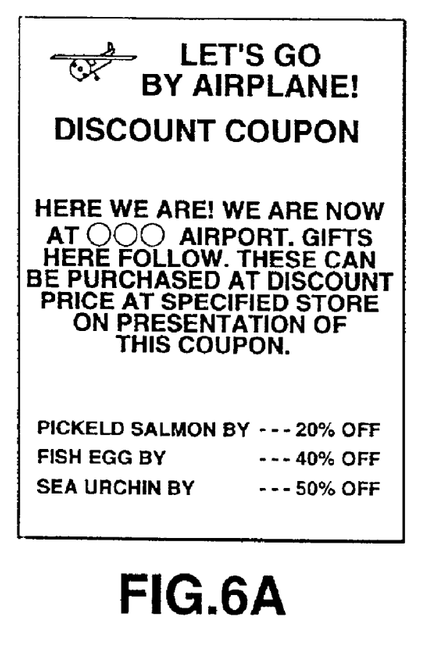
FIG. 6 is typical printing of privileges for the domestic game system.
Figure 6B:
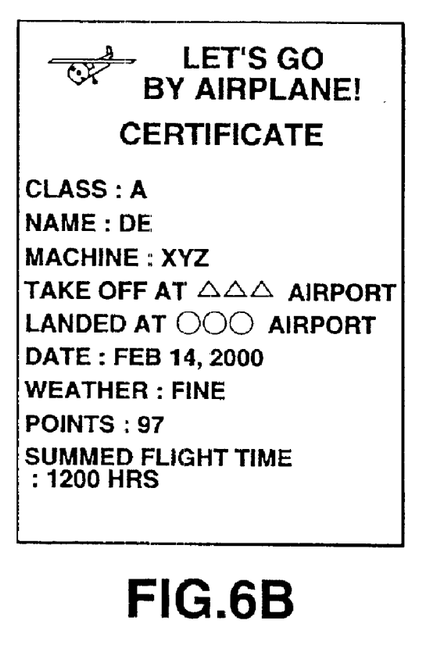
Figure 6C:
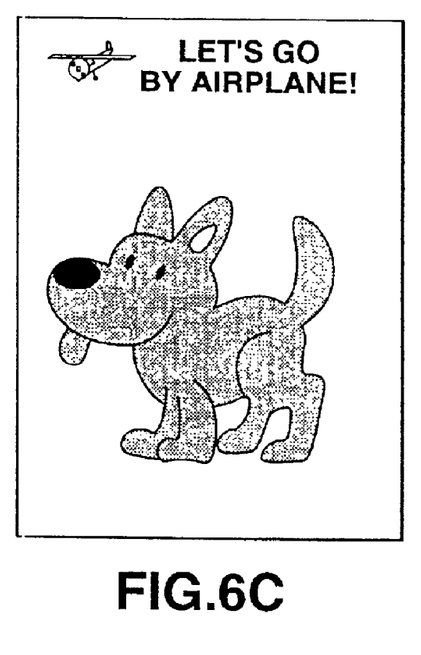
Figure 6D:
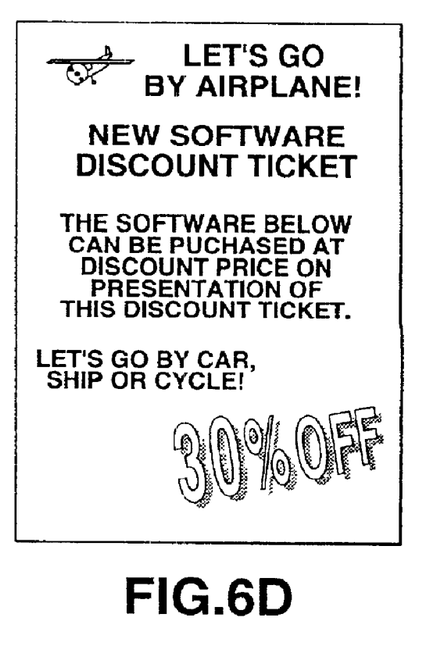

The processor 11 executes the video software program to progress the video game in accordance with the sequence shown in the flowchart of FIG. 5.

On booting the video software program, the processor 11 sets a stage number N (step S1) to execute the game of the game stage of the stage number N (step S2).

It is then verified at step S3 whether or not the game stage of the stage number N has been cleared. If the result of decision at step S3 is NO, that is if the game stage has not been cleared, the processor 10 reverts to step S2 to repeat the steps S2 and S3 to continue the execution of the game stage having the stage number N. If the result of decision at step S3 is YES, that is if the game stage has been cleared, the privilege information corresponding to the stage number N is taken out at step S4 to convert the privilege information into printing data (step S5).

The printer driver then is read out from the video game program recording medium 50 by the disc drive 12 to send the printing data to the printer 40 to execute the printing (step S6). It is then verified at step S7 whether or not the printing has come to a close as normally. If the result of decision at this step S7 is NO, that is if the printing has not come to a close as normally, the controller 10 reverts to step S6 to re-execute the printing.

If the result of decision at step S7 is YES, that is if the printing has come to a close as normally, N is set so as to be equal to N+1 (N=N+1), that is the stage number N is incremented by 1, (step S8).

It is then verified whether or not the selection for terminating the game has been made (step S9) and, if the result of decision is YES, that is if the selection for terminating the game has been made, the game is terminated. If the result of decision is NO, that is if the selection for continuing the game is made, the controller reverts to step S2 to execute the game of the game stage of the next stage number N.

That is, in this domestic game system 100, the game player, on clearing the game stage progressed in accordance with the video game software program read out from the video game program recording medium 50 acquires, as the privilege, the right to print the privilege information corresponding to the game stage of the stage number N cleared.

The printed matter, acquired as the printing result of the privilege information, is the printed matter valuable for the player in that it furnishes entertainment and profit apart from the game. For example, the printed matter may be a writing, such as 4-frame caricature, coupon ticket, certificate, collector's items, trading card, bromide, guides for commercial articles for customers, game software discount card and an ID password for accessing the service provider, passwords and addresses.

FIGS. 6A to D show printing examples of coupon tickets, certificates, collector's items and game software discount cards.

In the sequence shown in the flowchart shown in FIG. 5, printing is executed at a time point when the game stage is cleared. However, the right for printing may be reserved or abandoned. In preparing printing data, the game player may be prompted to enter the name, address or the telephone number by way of the printing data in addition to the contents. Moreover, the printer driver may be taken out before starting the game.

Figure 7:
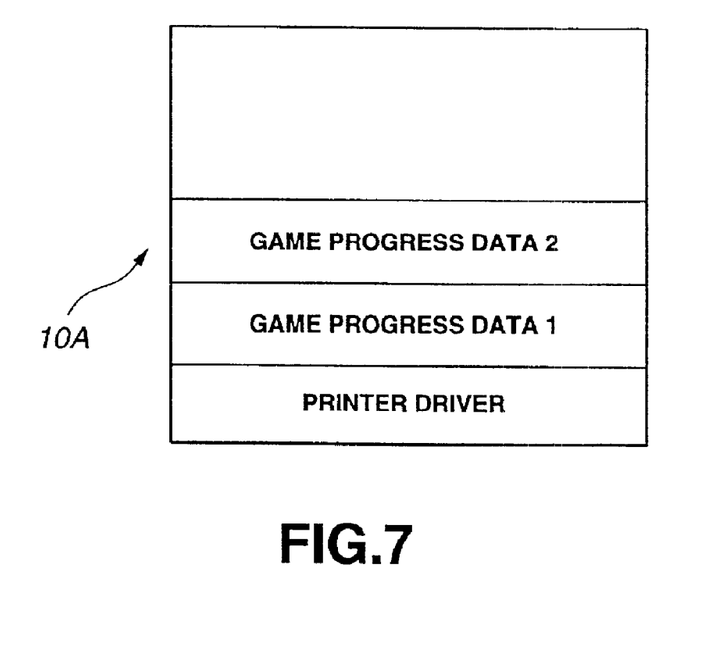
FIG. 7 schematically shows the stored contents of the memory card of the video game apparatus.
Figure 8:
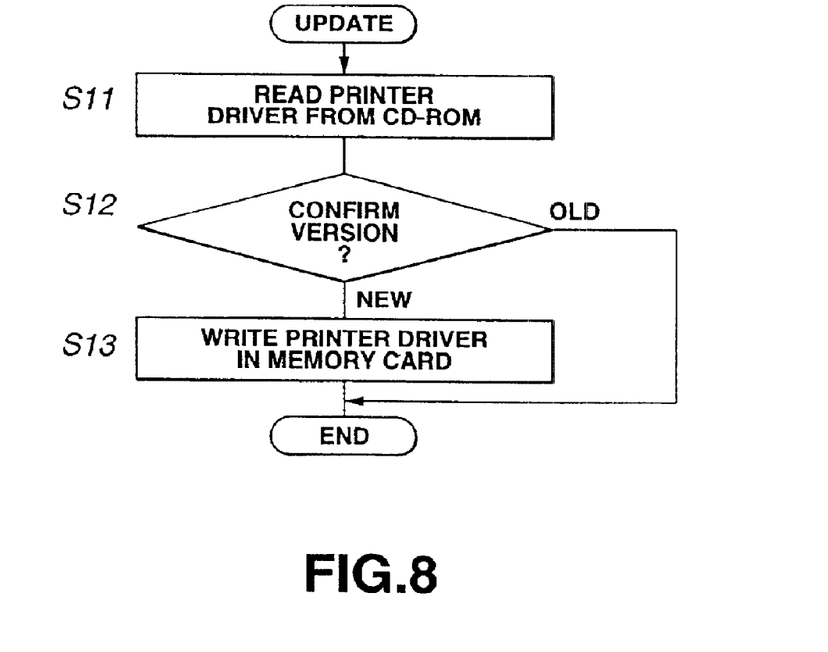
FIG. 8 is a flowchart showing the updating sequence of a printer driver in the memory card.

In the present video game apparatus 10, the printer driver is stored, along with the information as to the progress of the game, in a memory card 10A, comprised of a non-volatile memory, as shown in FIG. 7. Referring to the flowchart of FIG. 8, when the printer driver is read out from the video game program recording medium 50 (step S11), the version of the printer driver read out is checked (step S12). If the printer driver is of the new version, the printer driver in the memory card 10A is updated (step S13).

Figure 9:
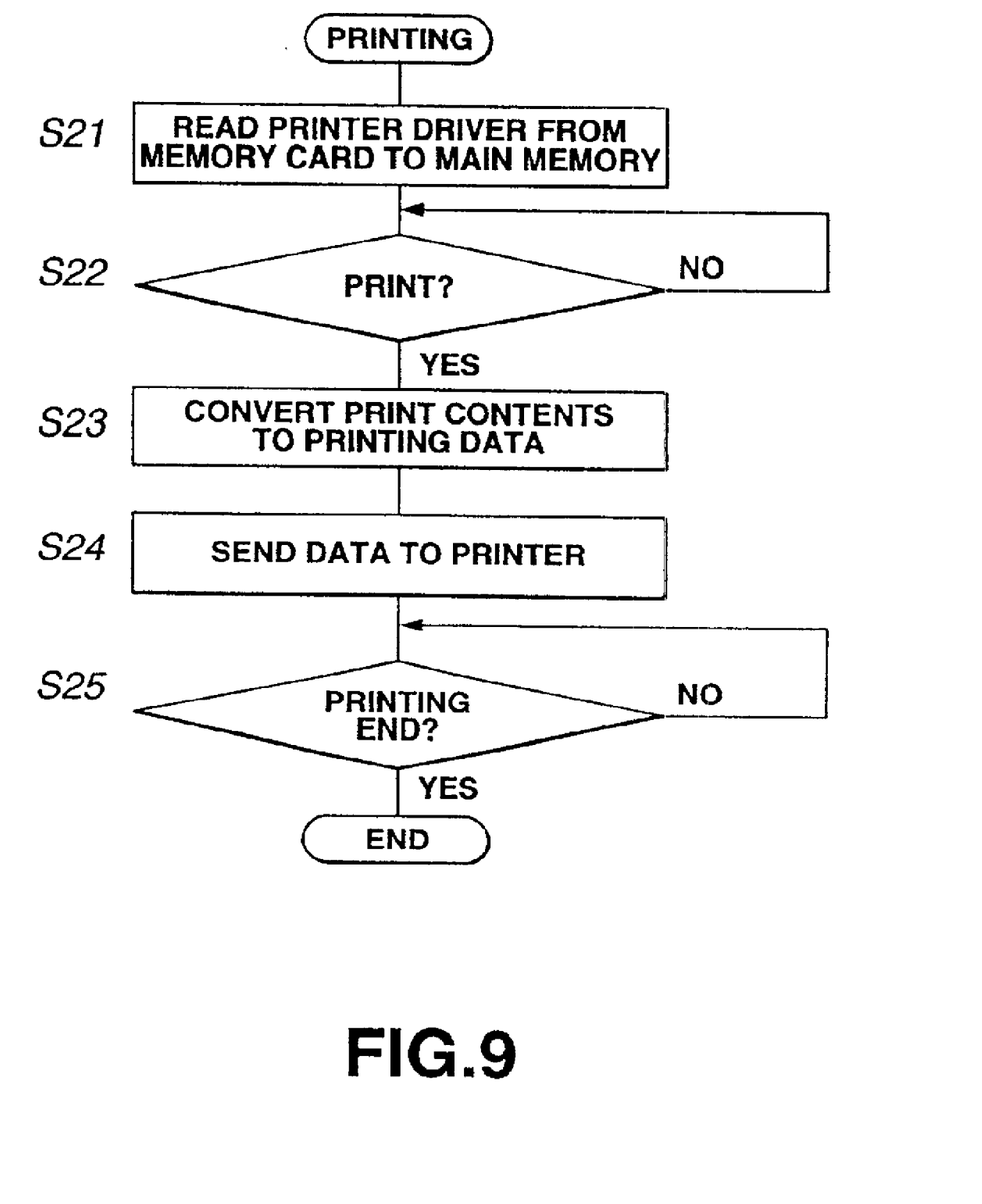
FIG. 9 is a flowchart showing the printing sequence in the domestic game system.

Referring to the flowchart of FIG. 9, the processor 11 reads out the printer driver from the memory card 10A onto the memory 13 (step S21) to wait for the printing executing command to be input (step S22). When the printing executing command is input, the contents to be printed is converted into printing data (step S23) and, using the printer driver on the memory 13, the printing data is sent to the printer 40 to execute the printing (step S24) to wait for the end of the printing (step S24).

Specifically, the printer driver in the present video game apparatus 10 is made up of a module of the common driver portion and a module of a printer inherent portion. If the driver supports plural printers, there are plural printer inherent portions. In the respective modules, there are included the module sort information and the version information as the ancillary information.

Figure 10:
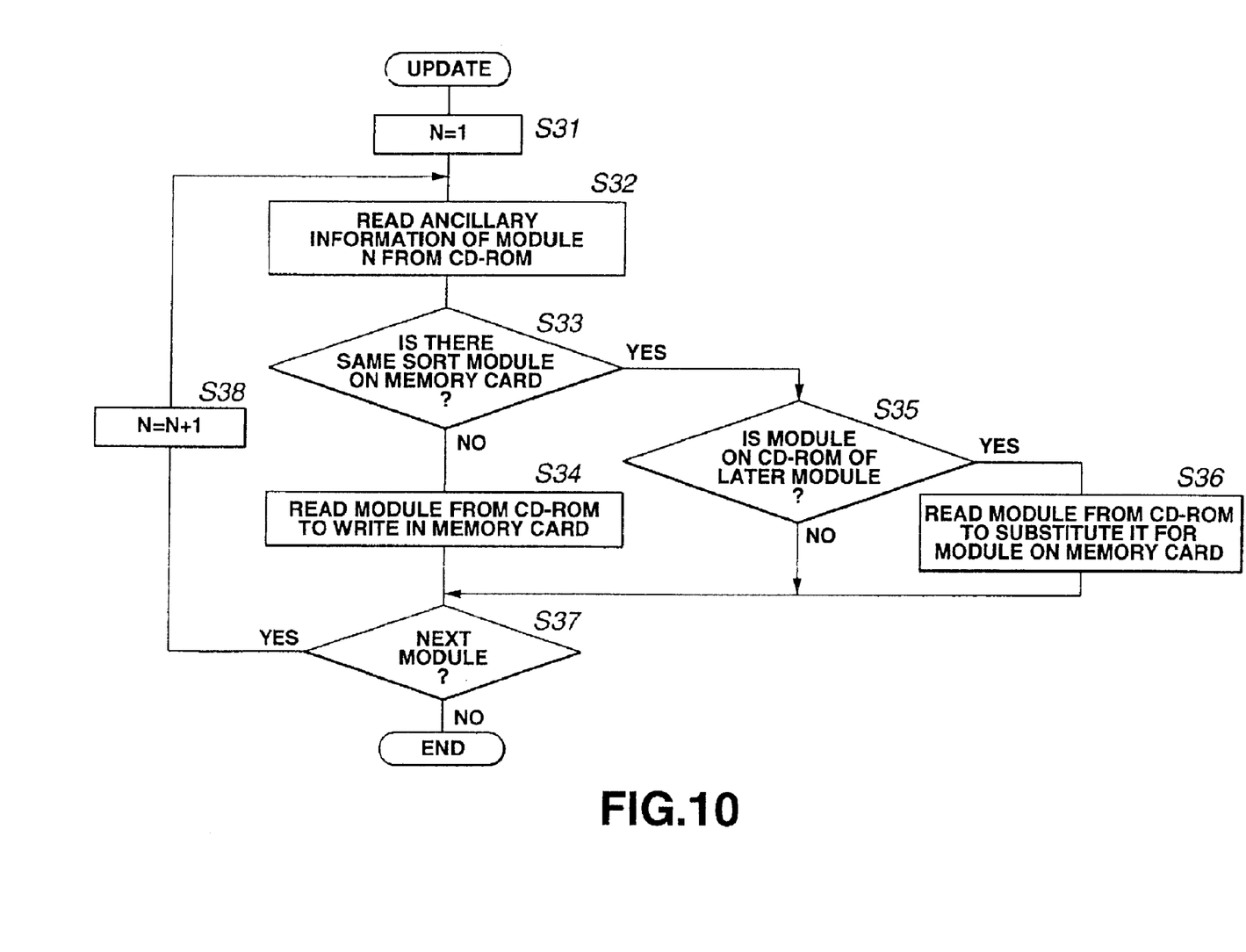
FIG. 10 is a flowchart for illustrating the specified sequence of the printer driver updating processing.

When the video game program recording medium 50 is inserted into the video game apparatus 10, the processing 11 on booting sets the module number N to 1 at step S31 in the flowchart of FIG. 10. The ancillary information of the module of the module number N is read out from the video game program recording medium 50 to confirm the sort and the version (step S32). It is then checked whether or not there is the same sort of the module on the memory card 10A (step S33). If there is no module of the same sort on the memory card 10A, the module is read from the video game program recording medium 50 to write the module so read on the memory card 10A (step S34). If there is the same sort of the module on the memory card 10A, it is checked whether or not it is the version of the module on the video game program recording medium 50 that is new (step S35). If the result of decision at step S35 is YES, the module is read from the video game program recording medium 50 for use in substitution for the module on the memory card 10A (step S36).

It is then checked whether or not there is the next module (step S37). If there is the next module, the module number is incremented. The processor then reverts to step S32 to repeat the processing as from step S32 to step S37. When the module to be processed is depleted, the printer driver updating processing comes to a close.

Figure 11:
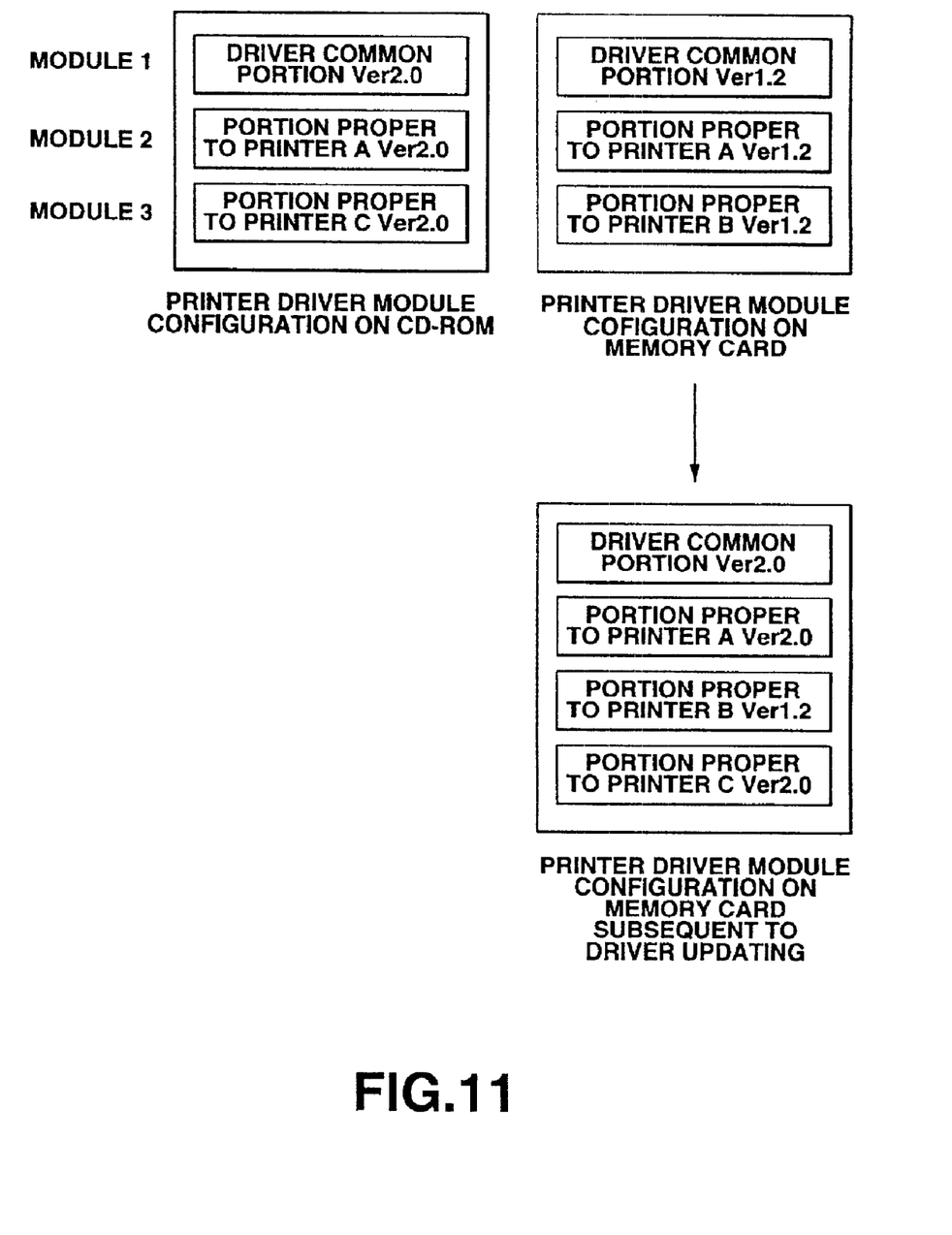
FIG. 11 schematically shows typical updating processing of the printer driver.

If, by such printer driver updating processing, there exists the proper portion of the printer B in the memory card 10A, but not in the video game program recording medium 50, as shown for example in FIG. 11, the proper portion of the printer B is left intact and the proper portion of the printer C not present in the memory card 10A is written as what may be called a supplement. On the other hand, the module already existing on the memory card 10A is replaced by the latest module.

What is claimed is:

1. A video game system in which a video game is progressed in accordance with a game software program read out from a video game program recording medium, the video game system comprising:

a video game apparatus which comprises:
video game software program readout means for reading out a video game software program from a video game program recording medium, having recorded thereon said video game software program, said video game software program being made up of a main portion of the video game software program, printing contents data and a printer driver for printing said printing contents data;
a non-volatile memory for storing a printer driver along with information on game progress;
printer driver updating means for updating the printer driver stored in said non-volatile memory by the new printer driver contained in the game software program read out by said video game software program readout means; and
printing controlling means for reading out the printer driver stored in said non-volatile memory to a work memory and for converting the printing contents data read out from said video game program recording medium by said video game software program readout means into printing data by using the printer driver on said work memory to output the printing data; and
a printing apparatus for printing said printing data in the course of the progress of the video game;
wherein said printer driver includes: a common engine module for performing a process which is not dependent on the printer type, and a plurality of dedicated engine modules, each corresponding to a respective type of printer, for performing a process which is dependent on the printer type.

2. A video game apparatus used in a video game system in which a video game is progressed in accordance with a game software program read out from a video game program recording medium, the video game apparatus comprising:

video game software program readout means for reading out a video game software program from a video game program recording medium, having recorded thereon said video game software program, said video game software program being made up of a main portion of the video game software program, printing contents data and a printer driver for printing said printing contents data;

a non-volatile memory for storing a printer driver along with information on the game progress;

printer driver updating means for updating the printer driver stored in said non-volatile memory by the new printer driver contained in the game software program read out by said video game software program readout means; and     printing controlling means for reading out the printer driver stored in said non-volatile memory to a work memory and for converting the printing contents data read out from said video game program recording medium by said video game software program readout means into printing data by using the printer driver on said work memory to output the printing data, which is printed in the course of the progress of the video game;

wherein said printer driver includes: a common engine module for performing a process which is not dependent on the printer type, and a plurality of dedicated engine modules, each corresponding to a respective type of printer, for performing a process which is dependent on the printer type.

3. A method for controlling a video game apparatus comprising the steps of:

reading out a video game software program from a video game program recording medium, having recorded thereon said video game software program, said video game software program being made up of a main portion of the video game software program, printing contents data and a printer driver for printing said printing contents data to execute a video game in accordance with said video game software program;

updating the printer driver stored in a non-volatile memory along with information on the game progress by a new printer driver contained in the game software program read out from said video game program recording medium; and     reading out the printer driver stored in said non-volatile memory to a work memory and converting the printing contents data read out from said video game program recording medium into printing data by using the printer driver on said work memory to print the printing data;

printing out said printing data in the course of the progress of the video game;

wherein said printer driver includes: a common engine module for performing a process which is not dependent on the printer type, and a plurality of dedicated engine modules, each corresponding to a respective type of printer, for performing a process which is dependent on the printer type.

4. A video game program recording medium having recorded thereon a computer-readable video game software program, the program comprising executable instructions that cause a computer to:

read out said computer-readable video game software program being made up of a main portion of the video game software program, printing contents data and a printer driver for printing said printing contents data to execute a video game in accordance with said video game software program;

update the printer driver stored in a non-volatile memory along with information on the game progress by a new printer driver contained in the game software program read out from said video game program recording medium; and     read out the printer driver stored in said non-volatile memory to a work memory and convert the printing contents data read out from said video game program recording medium into printing data by using the printer driver on said work memory to print the printing data;

print out said printing data in the course of the progress of the video game;

wherein said printer driver includes: a common engine module for performing a process which is not dependent on the printer type, and a plurality of dedicated engine modules, each corresponding to a respective type of printer, for performing a process which is dependent on the printer type.

5. The video game system of claim 1, wherein said printer driver updating means updates only outdated modules of the printer driver stored in said non-volatile memory with modules of the new printer driver contained in the game software program; and wherein an outdated module of the printer driver stored in said non-volatile memory is a module that is of an older version than a corresponding module in the new printer driver contained in the game software program.

6. The video game system of claim 1, wherein the printing contents data indicate one or more privilege items, and printing contents data for each privilege item are printed when execution of the video-game program indicates that a corresponding stage of the game has been reached.

7. The video game apparatus of claim 2, wherein said printer driver updating means updates only outdated modules of the printer driver stored in said non-volatile memory with modules of the new printer driver contained in the game software program; and wherein an outdated module of the printer driver stored in said non-volatile memory is a module that is of an older version than a corresponding module in the new printer driver contained in the game software program.

8. The video game apparatus of claim 2, wherein the printing contents data indicate one or more privilege items, and printing contents data for each privilege item are printed when execution of the video-game program indicates that a corresponding stage of the game has been reached.

9. The method of claim 3, wherein updating the printer driver includes updating only outdated modules of the printer driver stored in said non-volatile memory with modules of the new printer driver contained in the game software program; and wherein an outdated module of the printer driver stored in said non-volatile memory is a module that is of an older version than a corresponding module in the new printer driver contained in the game software program.

10. The method of claim 3, wherein the printing contents data indicate one or more privilege items, and printing contents data for each privilege item are printed when execution of the video-game program indicates that a corresponding stage of the game has been reached.

11. The video game program recording medium of claim 4, wherein the printing contents data indicate one or more privilege items, and printing contents data for each privilege item are printed when execution of the video-game program indicates that a corresponding stage of the game has been reached.

* * * * *